July 18, 1967 G. KRAUS 3,331,184
CASE PACKING APPARATUS
Filed April 13, 1964 8 Sheets-Sheet 1

INVENTOR
Gustav Kraus
BY
Townsend and Townsend
attorneys

July 18, 1967  G. KRAUS  3,331,184
CASE PACKING APPARATUS
Filed April 13, 1964  8 Sheets-Sheet 2
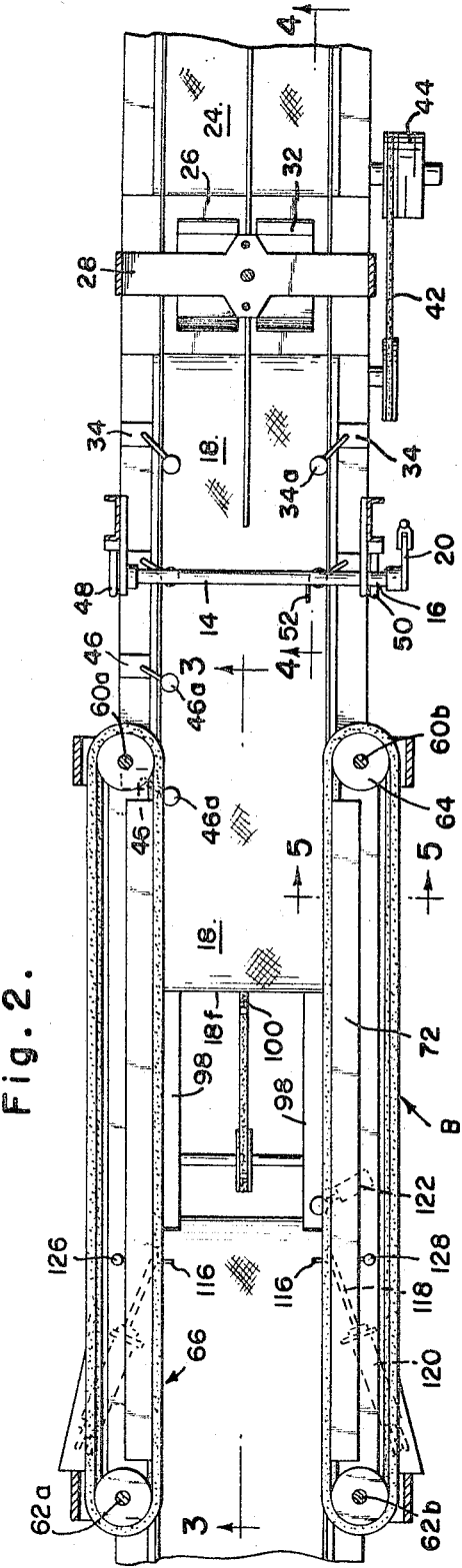
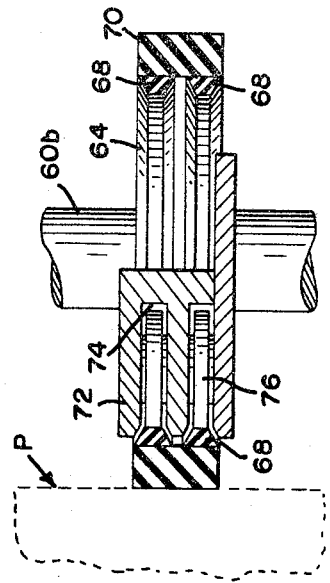
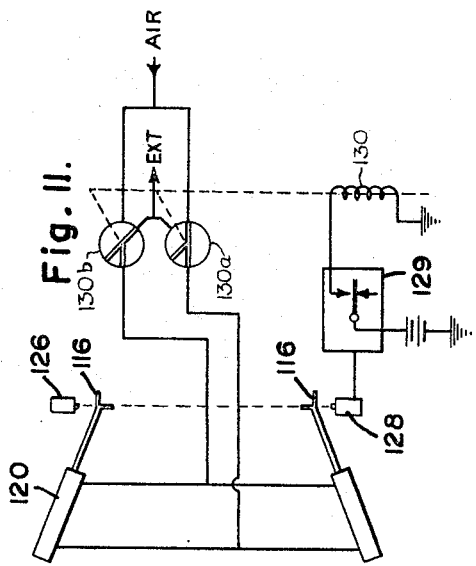
INVENTOR
Gustav Kraus
BY
Townsend and Townsend
attorneys

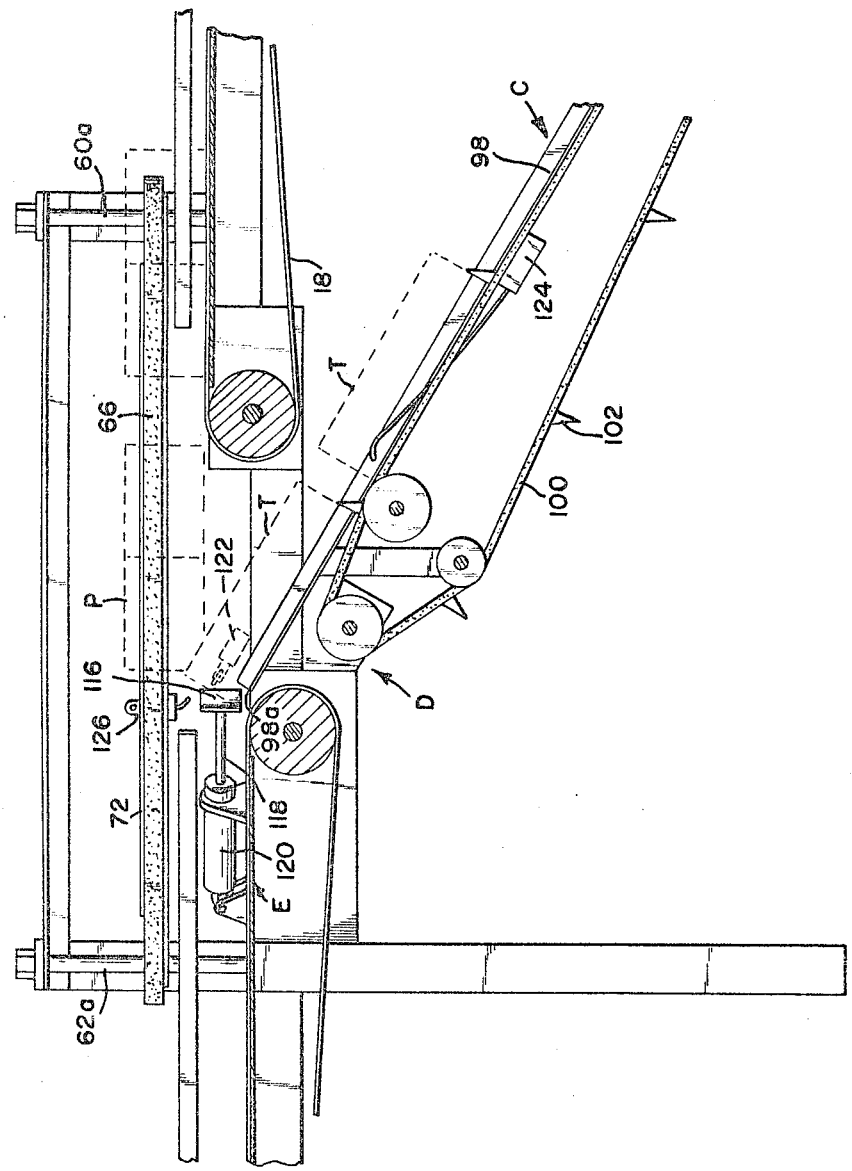

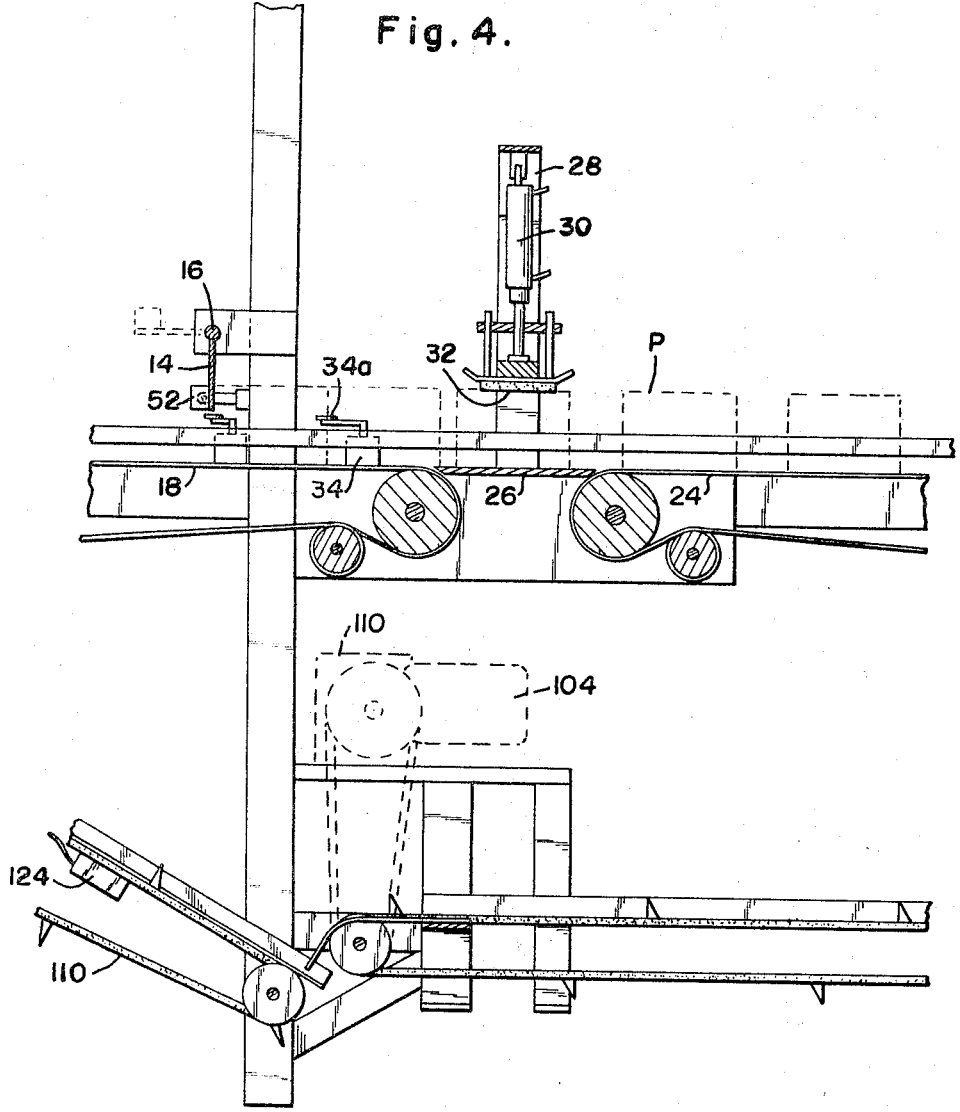

July 18, 1967 G. KRAUS 3,331,184
CASE PACKING APPARATUS
Filed April 13, 1964 8 Sheets-Sheet 5
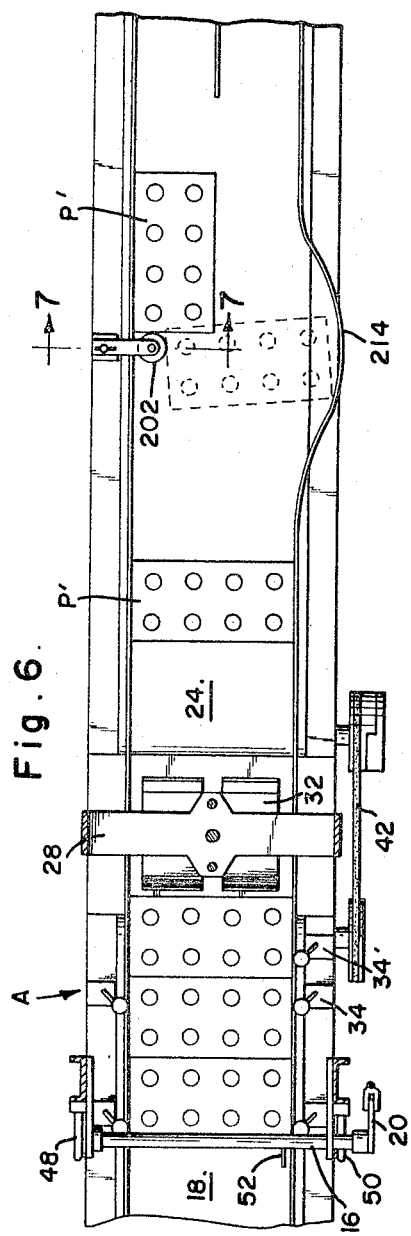
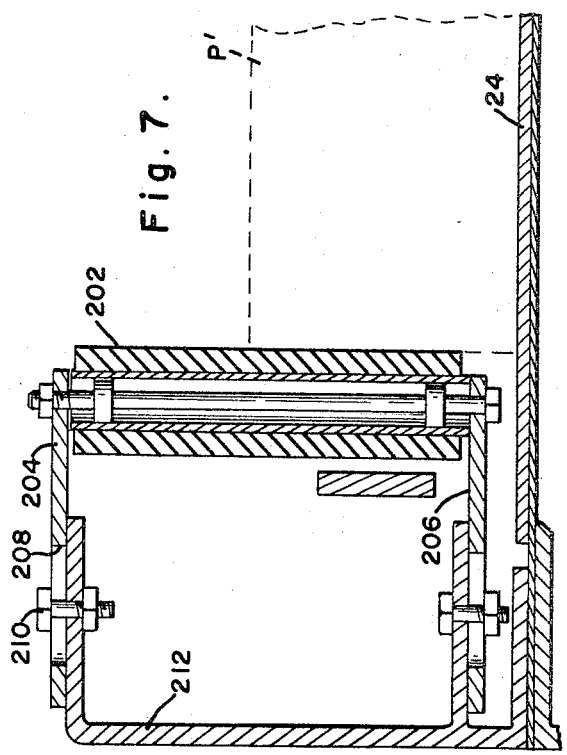
INVENTOR.
Gustav Kraus

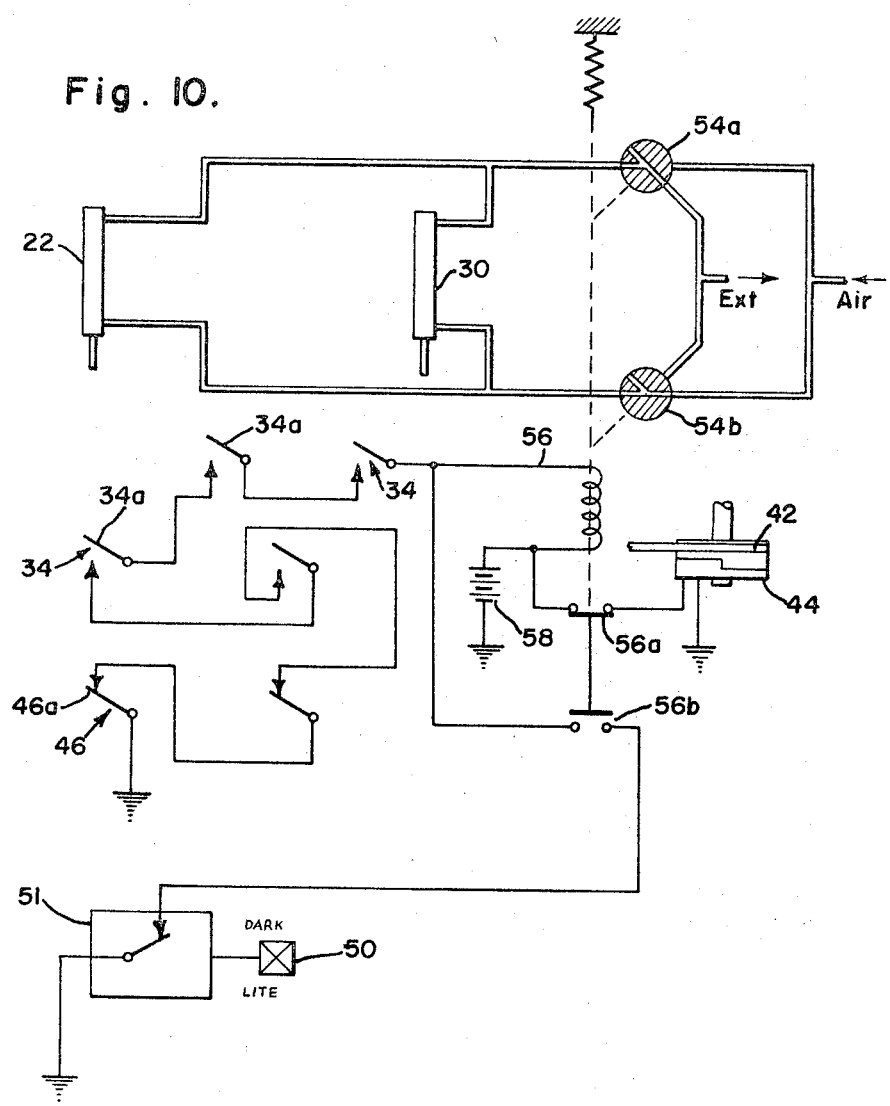

INVENTOR.
Gustav Kraus

United States Patent Office 3,331,184
Patented July 18, 1967

3,331,184
CASE PACKING APPARATUS
Gustav Kraus, 30 Lucerne St.,
San Francisco, Calif. 94103
Filed Apr. 13, 1964, Ser. No. 359,390
10 Claims. (Cl. 53—160)

This invention relates to apparatus for serially packing cases with a group of packages and is exemplified herein by a machine for filling cases with six-packs or eight-packs of bottled or canned beverages.

Prior art case packing machines of which I have knowledge have certain disadvantages, among which are their inflexibility in that they can handle either only canned beverages or only bottled beverages, inflexibility arising from the inability to pack cases with either six-packs or eight-packs, slow speed, rough handling of packages with consequent bottle breakage, and the like.

It is an object of the present invention to provide a high-speed versatile case packing machine which obviates the above-enumerated disadvantages.

The more specific object is to provide a machine which can handle both packages of cans and packages of bottles. This object is achieved in the present invention by providing apparatus for frictionally engaging the lateral edges of the packages to convey them toward a waiting case. The apparatus for effecting such frictional engagement takes the form of a pair of endless conveyors which have rubber or the like on their faces and which are moved in unison along the sides of a path. Packages engaged between the conveyors are thus transported.

Another object is to provide apparatus which is capable of rapid operation without damage to the cans, bottles, or contents theerof. A factor contributing to the high speed and the safety in the present apparatus is the provision of means for effecting upward pivotal movement of an empty case or tray into embracing relationship with a group of packages. Only after the embracing relation is accomplished are the packages deposited into the tray.

Still another object is to provide apparatus having various interlocks for interrupting system operation should a malfunction or an exhaustion of case supply or package supply occur. Accomplishment of this object contributes to the safety with which the apparatus handles relatively delicate bottles and cans, and is effected by a particular arrangement of photo-electric cells and associated light sources for controlling the various operations performed by the apparatus.

Yet another object is to provide apparatus which can pack cases with either six-packs or with eight-packs. A typical tray or case used in the brewing industry is sized to receive twenty-four cans or bottles. The cans or bottles can be arranged in four six-packs or in three eight-packs. This object is attained in the present invention by providing means active only in the case of eight packs for turning each eight-pack 90 degrees on a conveyor line. After the eight-packs are so turned they are grouped into groups of three and then carried to a waiting case or tray. Six-packs are not turned; they are grouped in groups of four and carried to the waiting trays in such groups.

These and other objects will be more apparent after referring to the following specifications and accompanying drawings in which:

FIGURE 2 is a top view of the apparatus of FIGURE 1 taken substantially along line 2—2 of FIGURE 1;

FIGURE 3 is a cross sectional view at enlarged scale of a portion of the apparatus and taken substantially along line 3—3 of FIGURE 2;

FIGURE 4 is a cross sectional view at enlarged scale of the apparatus and is taken substantially along 4—4 of FIGURE 2;

FIGURE 5 is a cross sectional view showing in detail a package supporting and conveying device of the present invention and is taken substantially along 5—5 of FIGURE 2;

FIGURE 6 is a plan view of a portion of my apparatus showing my improved form of package turning apparatus;

FIGURE 7 is a cross sectional view taken along line 7—7 of FIGURE 6;

FIGURE 10 is a schematic diagram of the control system for the package group arranging apparatus of the present invention;

FIGURE 11 is a schematic diagram of the tray arresting mechanism of the present invention;

The case packer of the present invention includes a mechanism A for arranging individual packages in the appropriate sized groups, a package group conveyor B for transporting the grouped packages forward, a sloped case conveyor C, a case filling side D wherein the case is pivoted upwardly into embracing relation with the package group in conveyor B, and a discharge conveyor E for transporting packed cases away from the apparatus.

Figure 1:
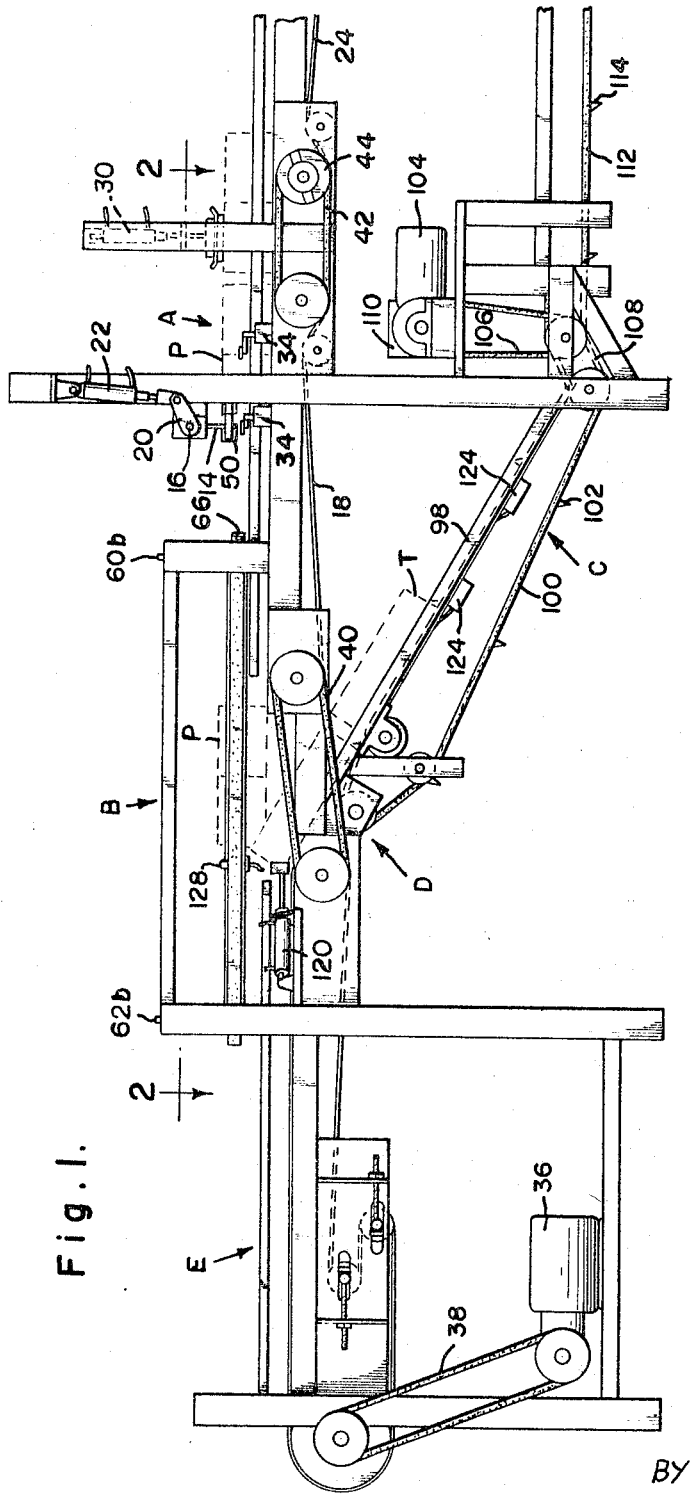
FIGURE 1 is a side elevation of one form of my invention.

Package arranging mechanism A includes a gate 14 mounted for pivotal movement around a horizontal shaft 16 and disposed over a continuously moving conveyor belt or the like 18. Attached to shaft 16 is a lever arm 20 to which the rod of a pneumatic cylinder 22 is pivotally secured to effect operation of gate 14 by actuation of the pneumatic cylinder. The pneumatic cylinder is suitably mounted to a frame member as shown in FIGURE 1 and is supplied with air from a conventional source not shown. Thus packages P are urged by continuously moving belts 18 into contact with gate 14 when the gate is in a closed position, which position is shown in solid lines in FIGURE 4. Six-packs are conveyed to continuously moving belts 18 from a conveyor belt 24 across a transfer plate 26. As will be described in detail hereinafter, conveyor belt 24 operates intermittently. Mounted to a frame 28 above transfer plate 26 is a conventional pneumatic cylinder 30 for moving a friction shoe 32 toward and away from transfer plate 26. Shoe 32 functions to prevent transfer of packages P across transfer plate 26 when it is moved to the downward position. Intermediate transfer plate 26 and gate 14 are four limit switches 34 each of which has an arm 34a engageable by the lateral edges of six-packs moving on conveyor 18; limit switches 34 function to sense the presence of four six-packs behind gate 14. The closure of all four limit switches 34 is a prerequisite to the opening of the gate 14.

Referring to FIGURE 1 a motor 36 is provided for driving discharge conveyor E through a conventional chain drive 38. Power is transmitted to conveyor belt 18 through a second conventional chain drive 40, and power is transmitted from conveyor 18 to conveyor belt 24 through a third conventional chain drive 42 and a normally disengaged electromagnetic clutch 44.

Forward of gate 14 are a pair of limit switches 46 each having an arm 46a in the path of travel packages P. Also within the path of package travel is a light beam from a light source 48 which is mounted on one side of the path of package travel and is directed toward a photo cell 50 on the opposite side of the path. Associated with and responsive to photo cell 50 is a conventional transducer 51, FIG. 10, which includes electrical contacts that open when the photo cell is illuminated by light source 48 and close when the illumination is discontinued. Mounted on the forward surface of gate 14 is an opaque projection 52 which interrupts the light beam between light source 48 and photo cell 50 when gate 14 is closed.

The operation of the mechanism for arranging of packages into groups may now be more fully understood by reference to FIGURE 10. Ganged two-way air control valves 54a and 54b are provided for actuating pneumatic cylinders 22 and 30 and are operated by a solenoid 56. In the position of valves 54a and 54b shown in FIGURE 10, gate 14 is down and shoe 32 is up. Additionally, clutch 44 is engaged as a consequence of which belt 24 is moving. As packages P move into position behind gate 14 they engage arms 34a of limit switches 34 and partially complete a circuit from a power source 58 to solenoid coil 56 through a conductor 59. The circuit to solenoid 56 is completed when limit switches 46 are closed, a condition which exists only when there are no six-packs in contact with moving arms 46a, since depression of arms 46a by packages opens limit switches 46. Assuming that six-packs forward of gate 14 have been cleared and loaded into the tray so that limit switches are closed as shown in FIGURE 10, the presence of four six-packs behind gate 14 causes solenoid 56 to be energized and air valves 54a and 54b to be operated. Air is thus supplied to the top air line of each pneumatic cylinder 22 and 30, as a consequence of which gate 14 is opened and shoe 32 is moved down to prevent transfer of packages over transfer plate 26. Simultaneous with such action, contact 56a opens to interrupt power to clutch 44 to disengage the clutch and stop conveyor 24. Since conveyor 18 is continuously moving the packages are moved forwardly and thereby temporarily prevent the establishment of a light beam from light source 48 to photo cell 50. Therefore, the contacts of transducer 51 complete a circuit through solenoid contacts 56b which locks solenoid 56 into an actuated position. When the packages have moved forward to package group conveyor B, a light beam is re-established between light source 48 and photo cell 50, as a consequence of which the contacts of transducer 51 open the circuit to solenoid coil 56 through contacts 56b thus releasing the solenoid. Therefore, air pressure is supplied to the lower air lines of pneumatic cylinders 22 and 30, as a consequence of which gate 14 is closed and shoe 32 is raised. In addition, clutch 44 is engaged to reactivate conveyor belt 24 and move additional packages in behind gate 14. Gate 14 will not open again until the previous group of packages has cleared limit switches 46a and the next group of packages is in place behind the gate so as to operate all four limit switches 34.

As the grouped packages travel forward on conveyor belt 18 the lateral surfaces of the group are engaged by package group conveyor B for transport toward case packing site C. Package group conveyor B includes a first pair of vertically journalled shafts 60a and 60b, and a second pair of shafts 62a and 62b spaced along the path of package travel from shafts 60a and 60b and beyond the termination of conveyor belt 18. Each of the shafts is provided with a suitable sheave 64 for supporting the package group engaging members 66. One form of package group engaging or gripping members is shown in FIGURE 5 and includes a pair of V-belts 68 on the outer surfaces of which is suitably affixed an endless pad 70 of resilient material, such as rubber. Mounted to the frame of the apparatus and extending intermediate shafts 60 and 62 are a pair of backup plates 72 for urging members 66 into group engaging relation. Back-up plates 72, FIGURE 5, include a pair of horizontal slots 74 in which are mounted at suitable intervals rollers 76 for supporting V-belts 68 thereon. In one installation of my invention rollers 76 are spaced along back-up plates 72 at about 1¾ inch intervals. Suitable means, not shown, are provided for laterally adjusting the back-up plates to assure firm frictional engagement of the package group.

Figure 12:
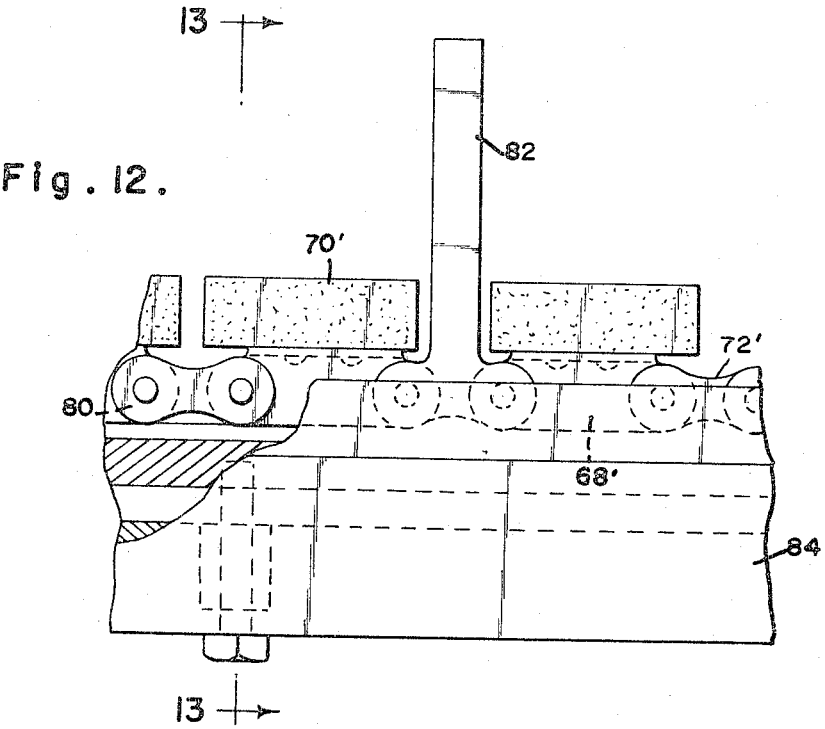
FIGURE 12 is a detail view of a modified form of package group conveyor.
Figure 13:
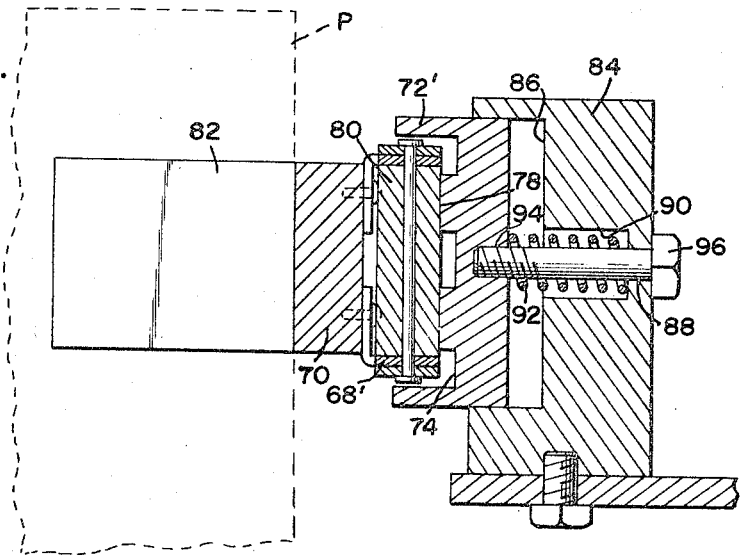
FIGURE 13 is a detail view of a modified form of back-up plate for the package group conveyor.

An alternate form of package group conveyor B is shown in FIGURE 12 and 13. In such alternate form there is provided double strand, endless chains 68', each link of which has a resilient pad 70' secured thereto for frictionally engaging the lateral surfaces of the package group. Sheaves 64 are replaced by conventional sprockets for driving and supporting chains 68'. A bronze back-up plate 72' is provided behind each inner reach of chain 68' and includes grooves 74' for affording clearance for the links. Back-up plates 72' define surfaces 78 for supporting the rollers 80 of chain 68'. In one machine constructed in accordance with this alternate form, I have provided carriers 82 which extend inwardly from chain 68' and are spaced along the chain at intervals of approximately 25 inches. The carriers engage the rear packages in a group and assist in retaining the group intact as it is conveyed by package group conveyor B.

FIGURE 13 additionally depicts a modification for mounting guide 72' so as to permit packages containing oversized bottles to be conveyed by group conveyor B. The exterior dimension of bottles used in bottling beer and the like can vary as much as 1/16 inch. To avoid damage to such bottles, I provide a mounting block 84 which is secured to the frame of the apparatus and excised at 86 to receive back-up plate 72' therein. Block 84 is bored at 88 and is provided with an enlarged diameter portion 90 to accommodate a compression spring 92. The rear face of back-up plate 72' is provided with a threaded hole 94 to receive a headed bolt or the like 96. When no package groups are opposite bolt 96 compression spring 92 urges back-up plate 72' and chain 68' inwardly, the inward movement being restricted by the head on bolt 96. Should packages containing oversized bottles be transported by the conveyor, compression spring 90 will yield so as to avoid breakage of oversized bottles. It will be obvious that belt back-up plate 72 can be mounted in a similar fashion to chain back-up plate 72'.

Suitable power trains not shown are provided for driving belts 66 in unison and toward the left as viewed in FIGURE 2. As a consequence of this, package groups residing between belts 66 are transported. Thus as the packages are moved past the end of conveyor 18 their forward movement is continued by package group conveyor B and into case packing site D.

Case conveyor C is provided for serially moving empty cases or trays T into case filling site D. The form of case conveyor shown in FIGURES 1–4 includes a pair of laterally spaced apart channels 98 which form a surface over which the trays T are slidably moved. The channels slope upwardly toward case packing site D at an angle of approximately 25–30 degrees with respect to horizontal. Supported between channels 98 is an endless chain conveyor 100 having a plurality of spaced apart cleats 102 thereon. Adjacent cleats 102 are spaced from one another by an amount slightly in excess of the length of tray T. Chain 100 is driven from a motor 104 through a conventional chain drive 106 and a second conventional chain drive 108. Power is supplied from motor 104 to chain drive 106 through a conventional magnetic clutch 110 disengagement of which interrupts the operation of chain 100. Also driven from chain drive 106 is a horizontal chain conveyor 112 having spaced apart dogs 114 thereon and positioned to transfer trays onto channels 98. Empty trays can be fed to chain conveyor 112 by any one of a number of well known expedients.

The upper ends of channels 98 terminate in case filling site D. The upward movement of trays on channels 98 is arrested by a pair of obliquely retractable stops 116 which stops are secured to the ends of rods 118 of pneumatic cylinders 120. A limit switch 122 is mounted at the case filling site to sense the arrival of a tray against stops 116. Limit switch 122 functions to disengage clutch 110 when a tray T has arrived in the filling site. Intermediate channels 98 and below the case filling site are a pair of limit switches 124 having electrical contacts that are closed when a tray is in place over the particular limit switch. Such contacts are connected in parallel with one another, the parallel combination of contacts being connected in series with conductor 59, FIGURE 10, so that, should both of the limit switches sense the absence of a tray, power from power source 58 to clutch 44 is interrupted. Thus, should the tray supply be interrupted, the flow of six-packs into the apparatus will be interrupted.

Packages moving into the apparatus on conveyor 24 are formed into groups by mechanism A, transported on conveyor belt 18, and frictionally engaged by group engaging members 66 of package conveyor B. As the grouped packages P move toward the left as viewed in FIGURE 3, the forward edge of the group impinges upon the inside of the forward panel of tray T and pivots the tray about stop 116 up to a horizontal position wherein the group is embraced by the tray. As tray T is thus moved into a horizontal position, the upper forward portion thereof interrupts the light beam from light source 126 to photo cell 128. By conventional circuitry such as that indicated schematically in FIGURE 11, contacts 129 close in response to interruption of the light beam so as to supply power to a solenoid 130 which actuates ganged two-way air valves 130a and 130b. Cylinders 122 thereby retract stops 116. Thereupon the tray moves to the left on discharge conveyor E, and the package group moves to the left by virtue of group conveyor B. At the left end of the group conveyor the package group is no longer supported and thus drops into the tray. The packed tray is then transported away from the apparatus on discharge conveyor E.

Figure 8:
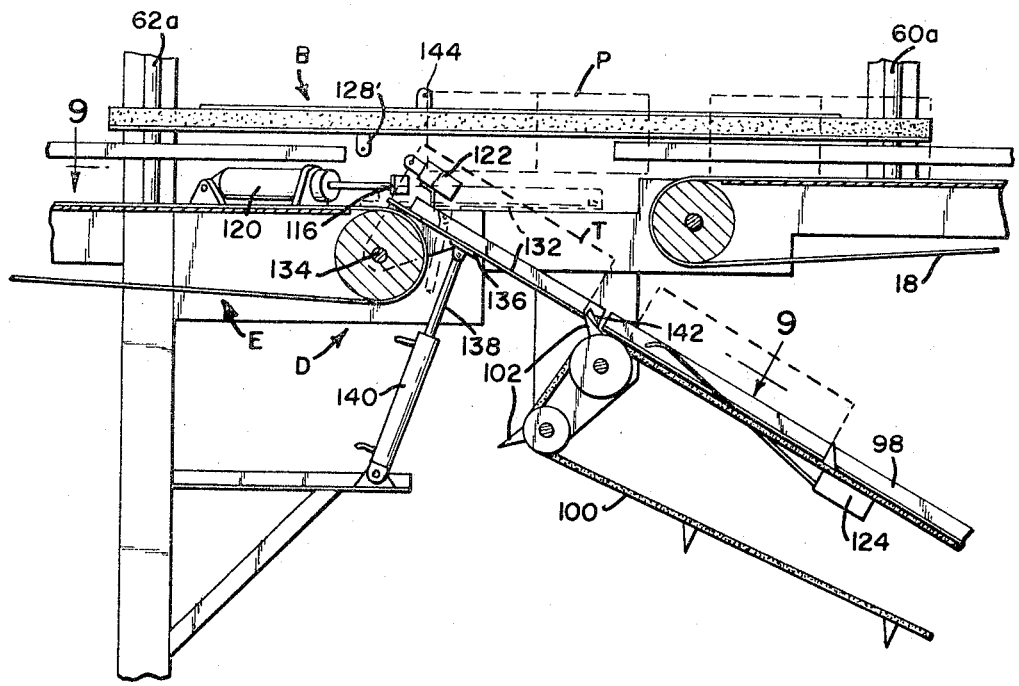
FIGURE 8 is a side elevational fragmentary view of another form of my improved apparatus.
Figure 9:
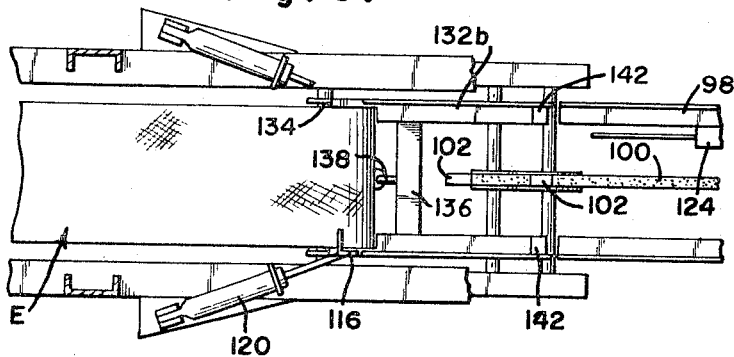
FIGURE 9 is a plan view of the embodiment of FIGURE 8 taken substantially along line 9—9 of FIGURE 8 and having portions broken away for clarity.

Referring to FIGURES 8 and 9 there is shown the preferred form of the apparatus constituting case packing site D. The site includes a pivotable platform 132 which is mounted for pivotal movement on shaft 134, the same shaft carrying the roller for discharge conveyor E. Platform 132 includes channel members 132a and 132b, which in the lower position of the platform, form a continuation of tray transporting channels 98. A transverse structural member 136 joins channel members 132a and 132b to complete platform 132. Pivotally secured to transverse member 136 is a rod 138 of a pneumatic cylinder 140, the other end of which is secured to the frame. Spaced from retractable stops 116 by an amount equal to the length of tray T are wedge-shaped cleats 142 which are affixed to channel members 132a and 132b to support tray T in proper spaced relation to the package group transported by conveyor B.

For controlling pneumatic cylinder 140 a photo cell 144 is provided for sensing a light beam traversing the path of travel of packages P and interrupted by their passage. Photo cell 144 is spaced so as to actuate pneumatic cylinder 140 as packages P near the front panel of tray T. Thus as the packages move to the left as viewed in FIGURE 8, photo cell 144 will cause cylinder 140 to move platform 132 and the tray carried thereby up to embracing relation beneath the grouped packages P. A second photo cell 128′ is provided for detecting a light beam which is interrupted by tray T when the tray reaches an approximate horizontal position. Through conventional control circuitry (not shown) interruption of light to photo cell 128′ effects withdrawal of stops 116 through actuation of pneumatic cylinders 120. Thus after the tray T has reached a horizontal position in which it embraces packages P and in which it rests on discharge conveyor E, stops 116 are withdrawn as a consequence of which tray T is transported to the left, as viewed in FIGURE 8, on the discharge conveyor and packages P similarly transported by package conveyor B. As described hereinabove, packages are deposited into the tray at the left end of package conveyor B. It will be noted in FIGURE 8 that empty tray conveyor 100 is so arranged that cleats 102 will move tray T above cleats 142 so as to support tray T in the proper position. Also as described hereinabove, limit switch 122 is provided for arresting movement of tray conveyor 100 when a tray T is in place on platform 132.

When the light beam is re-established to photo cell 144 by the passage of packages P toward the left of FIGURE 8, pneumatic cylinder 140 is actuated so as to move platform 132 downward to the position shown in the figure whereupon the steps of operation hereinabove described are repeated. Obviously, by the time platform 132 is restored to the lower position the light beam is re-established to photo cell 128′ thereby moving tray stops 116 back into the tray arresting position.

Referring now to FIGURES 6 and 7 there is shown a modification of my apparatus for use in filling a tray T with three eight-packs P′ instead of four six-packs. A typical eight-pack P′ includes two rows of four bottles each. Stationed rearwardly of package group forming mechanism is a roller 202 supported over conveyor 24 by an upper arm 204 and a lower arm 206. Each of the arms is provided with an elongate slot 208 through which passes a fastener 210 to adjustably join the arms to a framed extension 212. Thus roller 202 is adjustable transversely of the direction of travel of conveyor 24. Opposite roller 202 is a widened side guide member 214 which permits the eight-packs to be pivoted around roller 102 as shown most clearly in FIGURE 6.

In operation of this feature of my invention roller 202 is moved into the path of package travel by loosening fasteners 210 and eight-packs P′ are caused by any conventional conveying apparatus not shown to move along conveyor 24 along the side thereof proximate roller 202. As the leading edge of each eight-pack contacts roller 202 motion of the leading edge of the package is arrested and motion of the trailing edge of the package takes place on an arcuate path around the central axis of the roller. When the leading edge clears roller 202, shortly after the position shown in broken lines in FIGURE 6, the eight-pack is aligned transversely of conveyor 24 and moves forwardly toward group forming mechanism A. Intermediate shoe 32 and shaft 16 a third limit switch 34′ is provided so that the presence of the rearward most eight-pack behind gate 14 is sensed by the control circuitry. Limit switch 34′ is included in series with limit switches 34 (FIGURE 10) so that gate 14 will open only when three eight-packs reside in place behind the gate. When the gate opens the grouped eight-packs move forwardly and are deposited into the tray as described hereinabove.

To summarize the operation of my apparatus: Packages are moved into group forming apparatus A and the group is transported on conveyor 18 toward group conveyor B. Simultaneous with such movement of the grouped packages an empty tray is moved on tray conveyor C into case filling site D. When the grouped package moves toward the tray, the tray is pivoted upwardly into embracing relation with the grouped packages and the tray and packages are transported to other apparatus on discharge conveyor E. Thus it will be seen that I have provided a relatively uncomplex apparatus for filling trays with packages which apparatus is capable of high speed operation and which handles the packages and trays with sufficient gentleness to avoid breakage. Interlocks between various portions of the apparatus are provided for interrupting operation should a malfunction occur or should the supply of packages or trays become exhausted.

While several embodiments of the invention have been shown and described, it will be apparent that other adaptations and modifications can be made without departing from the true spirit and scope of the invention.

I claim:
1. Apparatus for filling a case with a group of packages which group has an outline approximately congruent to the interior outline of the case comprising means for conveying the group of packages along a line, a pair of mutually parallel endless conveyors for frictionally engaging the group at a site intermediate the vertical extremities of opposite lateral sides of a group of packages emanating from said conveying means, means for moving package groups engaged by said endless conveyors away from said conveying means along a line of conveyance, means for securing a case in upwardly slanting relation with one inner surface of the case disposed in the line of conveyance of the group of packages, said case securing means being adapted to releasably secure the lower forward edge of the case to afford pivotal movement of the case about said securing means in response to engagement by the group of packages with the inner case surface whereby the case pivots upwardly to embrace the group of packages, means for releasing said securing means when said case embraces the group of packages, and means for conveying said case and said packages away from said case securing means upon release of said securing means.

2. Apparatus for filling a rectangular case with a group of packages approximately congruent with the interior of the case comprising a pair of horizontally opposed spaced apart endless conveyors for frictionally engaging the group of articles at opposite lateral surfaces thereof intermediate the upper and lower extremities thereof, means for driving said conveyors to effect forward travel of the group of packages engaged thereby, means for supporting a case in an upwardly sloping position at a filling site within the line of travel of the group of packages so that the group of packages engages the upper part of the interior of the case, means for releasably securing the case at the bottom of a forward exterior portion thereof to afford pivotal movement of the case about said securing means in response to engagement of the case interior by the group of packages in order to effect embracement of the group by the case, means responsive to the pivotal movement of the case to release said securing means when said case has pivoted to embrace said group, and means for conveying the case forwardly upon release of said securing means.

3. Apparatus for filling a rectangular case with a group of packages which group is approximately congruent with the interior outline of said case, the apparatus comprising means for frictionally engaging opposite lateral faces of said packages, means for driving said engaging means along two parallel lines, said lines being spaced apart by an amount sufficient to compress said engaging means into frictional contact with the lateral faces of said packages, thereby to tranport the packages along a path between said lines, means for supporting a case in sloped relation to said path, means for selectively pivoting said case supporting means from the sloped position into embracing relation to packages in said path, means for actuating said pivoting means in response to arrival of said packages adjacent said case supporting means, and means for conveying said case away from said case supporting means in response to arrival of said case to a package embracing position.

4. Apparatus for serially filling each of a series of cases with a group of packages approximately congruent to the interior of a case comprising means for forming the packages in a group, means for conveying the group away from said group forming means, a pair of endless conveyors disposed on opposite sides of said conveying means and having parallelly confronting reaches for frictionally engaging opposite lateral surfaces of the group of packages, said endless conveyors extending beyond said group conveying means, means for driving package groups engaged by said endless conveyors at a linear speed substantially equal to that of the group conveying means, means for supporting a case beneath said endless conveyors in the line of travel of the package group therebetween; means for serially transporting cases to said case supporting means, said case supporting means being adapted to support said case in a position whereby the group of packages between said endless conveyors enters the interior of the case and engages the forward panel thereof, means for releasably securing the lower forward edge of the case to afford pivotal movement of the case about said securing means in response to engagement of the forward case panel by the group of packages whereby the case embraces the group, means for releasing said case securing means when said case embraces said group, and means for conveying the case forwardly of said released securing means at a speed substantially equal to said driven endless conveyors.

5. Apparatus in accordance with claim 4 wherein said case transporting means comprises an upwardly sloping endless conveyor adapted to convey cases in spaced apart relation to said case supporting means, a generally horizontal endless conveyer for conveying cases to said sloping conveyor, means for driving said conveyors in unison, means responsive to the arrival of a case at said case edge securing means for interrupting said conveyor driving means, and means responsive to forward conveyance of said case and grouped packages from said case supporting means for reactivating said case conveyor driving means.

6. Apparatus for filling a case with a group of packages approximately congruent to the interior outline of the case comprising means for conveying said group in suspended relation along a path, means for supporting a case in angular relation to said path with the forward panel of the case within the path and with the rear panel of the case without the path, a driven endless discharge conveyor having an input end beneath and in contact with the case in said case supporting means, means for releasably arresting movement of said case by said endless discharge conveyor when the case is in said case supporting means, means for selectively pivotally moving said case supporting means so that the rear panel of the case supported thereby is moved into the path of group travel, means for pivotally moving said case supporting means in response to approach of said group to said case, said pivotally moving means being timed with respect to movement of said group to cause said case to embrace said group upon pivotal movement of said case, means for releasing said case movement arresting means in response to said supporting means moving said case into group embracing position, whereby said case is conveyed away on said discharge conveyor and said group is conveyed by said group conveying means.

7. Apparatus according to claim 6 wherein said group conveying means comprises means for frictionally engaging a portion of each lateral surface of the packages of the group and means for driving said engaging means in unison on opposite sides of said path, said driving means being adapted to urge said engaging means inwardly into frictional engagement with the lateral surfaces of said packages.

8. Apparatus according to claim 6 in combination with means for sequentially transporting empty cases to said case transporting means upon arrival of a case against said case movement arresting means.

9. Apparatus for arranging packages in a rectangular group and conveying the group of packages into a case comprising a first belt having an output end for forwardly conveying individual packages along a generally horizontal line, a second belt for forwardly conveying individual packages along a generally horizontal line, said second conveying belt being disposed adjacent the output end of said first conveying belt, a relatively frictionless plate for transferring packages from said conveying belt to said second conveying belt, means for releasably arresting the forward movement of packages on said second conveying belt at a site spaced from said plate, a shoe vertically movable toward and away from said plate for selectively preventing the transferring of packages across said transfer plate, means intermediate said plate and said package arresting means for sensing the presence of a preselected number of packages arrested by said arresting means, means responsive to said sensing means for simultaneously interrupting said first conveyor means and moving said shoe to a package transfer preventing condition when the presence of the preselected number of packages is sensed, means responsive to said shoe moving means for releasing said package arresting means when said shoe is in a package transfer preventing condition thereby to permit forward movement of the grouped packages on said second conveying means, a pair of mutually confronting endless driven conveyors disposed above and on opposite sides of said second conveying means, said endless driven conveyors being adapted to frictionally engage opposite lateral surfaces of the group of packages, said endless conveyors extending beyond said second conveying belt, means for supporting a case beneath last said endless conveyors in sloped package receiving relation, said case supporting means including means for releasably arresting forward movement of the lower edge of said case to afford pivotal movement of said case about said case arresting means, means for releasing said case arresting means upon pivotal movement of said case in response to entry of the grouped packages into said case, and means for conveying the filled case away from said released case arresting means.

10. Apparatus for filling a case with a group of packages which group has an outline approximately congruent to the interior outline of the case comprising means for conveying the group of packages along a path, a pair of flexible endless package gripping members, means for constraining portions of each of said gripping members for movement in unison along parallelly spaced apart confronting lines for frictionally engaging the package group at a site intermediate the vertical extremities of opposite lateral sides of a group of packages emanating from said conveying means, means for moving packages engaged by said endless gripping members away from said conveying means along a line of conveyance, means for supporting a case in upwardly slanting relation with one inner surface of the case disposed in the line of conveyance of the group of packages engaged by said gripping means, means adjacent said supporting means for engaging the case to permit upward pivotal movement of the case into embracing relation to the group of packages, and means for conveying said case and the packages embraced thereby away from said case supporting means.

References Cited

UNITED STATES PATENTS

| | | | |
|---|---|---|---|
| 1,973,737 | 9/1934 | Williams | 53—32 |
| 2,007,439 | 7/1935 | Barritt | 53—388 |
| 2,049,876 | 8/1936 | Sticelber | 53—388 |
| 2,187,101 | 1/1940 | Schneider | 198—168 X |
| 3,034,637 | 5/1962 | Swezey et al. | 198—193 X |
| 3,053,025 | 9/1962 | Nigrelli et al. | 53—247 X |
| 3,164,938 | 1/1965 | Waite | 53—379 |
| 3,179,237 | 4/1965 | Ninneman | 198—165 |

ROBERT C. RIORDON, *Primary Examiner.*

FRANK E. BAILEY, *Examiner.*

R. L. FARRIS, *Assistant Examiner.*